US010958412B1

(12) United States Patent
Barrenscheen

(10) Patent No.: US 10,958,412 B1
(45) Date of Patent: Mar. 23, 2021

(54) COMMUNICATION USING EDGE TIMING IN A SIGNAL

(71) Applicant: Infineon Technologies AG, Neubiberg (DE)

(72) Inventor: Jens Barrenscheen, Munich (DE)

(73) Assignee: Infineon Technologies AG, Neubiberg (DE)

(*) Notice: Subject to any disclaimer, the term of this patent is extended or adjusted under 35 U.S.C. 154(b) by 0 days.

(21) Appl. No.: 16/748,987

(22) Filed: Jan. 22, 2020

(51) Int. Cl.
*H04L 7/00* (2006.01)
*H04L 7/033* (2006.01)

(52) U.S. Cl.
CPC ............ *H04L 7/033* (2013.01); *H04L 7/0091* (2013.01)

(58) Field of Classification Search
CPC ....... G06F 1/10; H04L 7/0008; H04L 7/0012; H04J 3/0685; H04W 84/20
USPC .................................................. 375/356, 354
See application file for complete search history.

(56) References Cited

U.S. PATENT DOCUMENTS

| 5,020,038 | A | * | 5/1991 | Swapp ..................... G04F 10/00 368/120 |
| 6,178,206 | B1 | | 1/2001 | Kelly |
| 7,203,230 | B2 | | 4/2007 | Vaananen |
| 9,184,909 | B1 | | 11/2015 | McCracken |
| 2001/0023468 | A1 | | 9/2001 | Oh |
| 2004/0228400 | A1 | | 11/2004 | Tanaka |
| 2005/0235110 | A1 | | 10/2005 | Mylly |
| 2006/0187969 | A1 | | 8/2006 | Kadowaki |
| 2009/0070506 | A1 | | 3/2009 | Furtner |
| 2010/0080332 | A1 | | 4/2010 | Koto |
| 2011/0185215 | A1 | | 7/2011 | Neben |
| 2012/0275527 | A1 | * | 11/2012 | Douglass ............ H04L 25/0272 375/257 |
| 2013/0246675 | A1 | | 9/2013 | Korpinen |
| 2014/0241414 | A1 | | 8/2014 | Reidl |

(Continued)

FOREIGN PATENT DOCUMENTS

| CA | 2882321 A1 | 6/2013 |
| CN | 102457267 A | 5/2012 |
| WO | 2018173623 A1 | 9/2018 |

OTHER PUBLICATIONS

Non-Final Office Action dated Feb. 28, 2020 in connection with U.S. Appl. 15/943,985.

(Continued)

*Primary Examiner* — Khai Tran
(74) *Attorney, Agent, or Firm* — Eschweiler & Potashnik, LLC

(57) ABSTRACT

Systems, methods, and circuitries are provided to perform bidirectional communication using edge timing. In one example, a method includes receiving, on a first signal line, a first signal having a first timing edge and a first data edge. The first timing edge is of a different type than the first data edge. The first data edge is an edge immediately adjacent to the first timing edge and occurs at a first elapsed time after the first timing edge. The method includes sampling the first signal at a predetermined sample time after the first timing edge to determine a first data value. A second data value is determined and a second signal is generated having a second timing edge and a second data edge. A second elapsed time between the second timing edge and the second data edge encodes a second data value. The second signal is transmitted on a second signal line.

21 Claims, 9 Drawing Sheets

(56) References Cited

U.S. PATENT DOCUMENTS

| | | | |
|---|---|---|---|
| 2015/0009050 A1* | 1/2015 | Lahr | ............. H03M 5/12 341/70 |
| 2015/0270994 A1 | 9/2015 | Scherr | |
| 2015/0372701 A1 | 12/2015 | Wang | |
| 2016/0294544 A1 | 10/2016 | Jang | |
| 2017/0060791 A1 | 3/2017 | Huh | |
| 2018/0237148 A1 | 8/2018 | Hehn | |
| 2019/0306014 A1 | 10/2019 | Barrenscheen | |

OTHER PUBLICATIONS

Notice of Allowance dated Aug. 10, 2020 in connection with U.S. Appl. No. 15/943,985.

* cited by examiner

COMMUNICATION USING EDGE TIMING IN A SIGNAL

FIELD

The present disclosure relates to the field of communication protocols and techniques and in particular to methods, systems, and circuitry for communication of status and data between devices.

BACKGROUND

Many microprocessor applications rely on a robust, simple, and low-bandwidth communication path between two devices. In safety-relevant applications, a large number of communication paths are used to ensure that each safety-relevant device is functioning properly. Thus, it is important that the communication paths in such applications support fast and reliable communication without requiring an extensive number of pins or extra components.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

In some microprocessor device applications, a central or master controller monitors the health or status of many different edge or slave devices under the control of the master controller. If any slave device malfunctions, the master controller takes remedial action such as ceasing communication with the malfunctioning device and/or entering some sort of fail safe mode with respect to the function performed by the malfunctioning device. Each slave device in turn monitors the health or status of the master controller and enters a fail safe mode in the event that the master controller malfunctions. The reaction time target for such systems is on the order of several tens of microseconds to several hundreds of microseconds. Because the malfunction of one slave device should not be allowed to corrupt the communication of another slave device, a dedicated communication channel is often installed between each slave device and the master controller. Thus the continuous monitoring of status between master controller and slave device requires fast and reliable communication through numerous communication paths.

For the purposes of this description, the terms "master" and "slave" will be used to distinguish between two devices performing the described communication using edge timing in a signal. It is to be understood that the described techniques can be performed by any two devices, regardless of whether the devices are in a master-slave relationship. Further, while certain functions in the communication techniques may be attributed to one of the master device or the slave device, it is to be understood that the functions may instead or additionally be performed by the other of the master or slave device.

Communication or data exchange between building blocks or devices is important for electronic components or control units. Depending on the needs for data throughput (baud rate), robustness of data lines (physical layer), and data treatment performance (simplicity of protocol) many different protocols and physical layers are available. However, with the upcoming and rapidly growing requirements for safety and more precise operation of motors and other loads or actuators (for combustion engines as well as electric drives), there is a need for a simple, inexpensive, and fast (e.g., up to and above 100 MBits/s) communication interface that facilitates more data exchange between a microcontroller and sensors or actuator drivers either on-chip or off-chip.

Figure 1A:
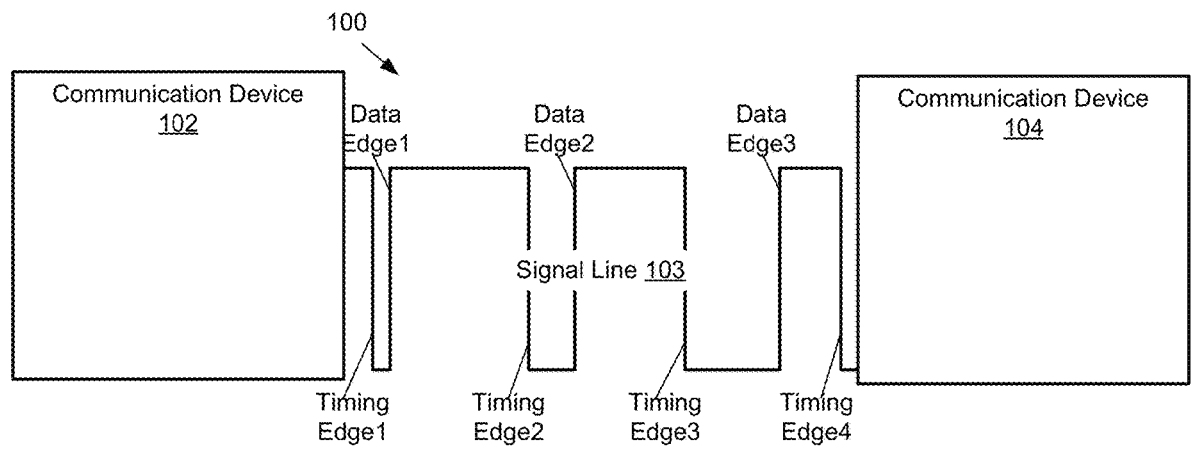
FIGS. 1A and 1B illustrate examples of communication systems that include two devices performing communication using edge timing in a signal in accordance with various aspects described.
Figure 1B:
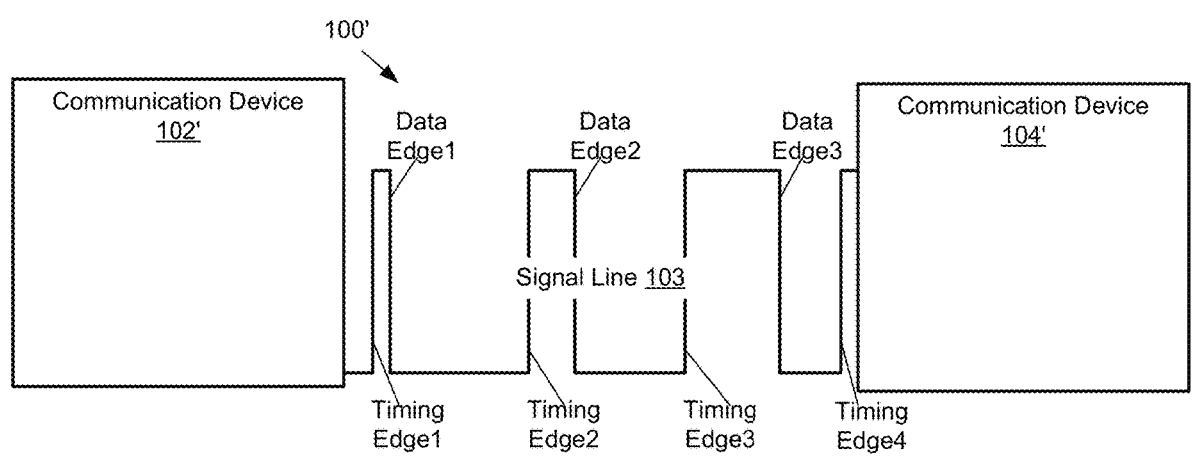

As illustrated generally in FIGS. 1A and 1B, described herein are methods, systems, and circuitries that perform a self-synchronizing data communication scheme in which devices communicate using the timing of edges in a signal. A master communication device (e.g., device 102) (hereinafter "master") sends a stream of timing edges having a fixed timing defined by a desired baud rate. The fixed timing of the timing edges is independent of the transferred data bit. The timing of the other edge, the data edge, defines the data value that is transferred. FIG. 1A illustrates edge timing based communication in which falling edges are timing edges and rising edges are data edges. FIG. 1B illustrates edge timing based communication in which rising edges are timing edges and falling edges are data edges.

If the master sends data to a slave communication device (e.g., device 104)(hereinafter "slave"), the master modulates the timing of the data edges according to the data bits to be transferred such that the elapsed time between the timing edge and the data edge encodes a data bit value being communicated. For example, if a data bit with a value of 0 is to be transferred, the timing distance of the data edge with respect to the immediately prior timing edge is different as compared to the timing of the data edge when a data bit of 1 is to be transferred.

When the master seeks data from a slave, the master sends out a signal that includes a sequence of timing edges and data edges, in which the position of the data edge may communicate to the slave that data is sought. The signal is modified by the slave to position data edges into timing with respect to timing edges that encodes data values being sent. The modified signal is transmitted to the master.

Figure 6:
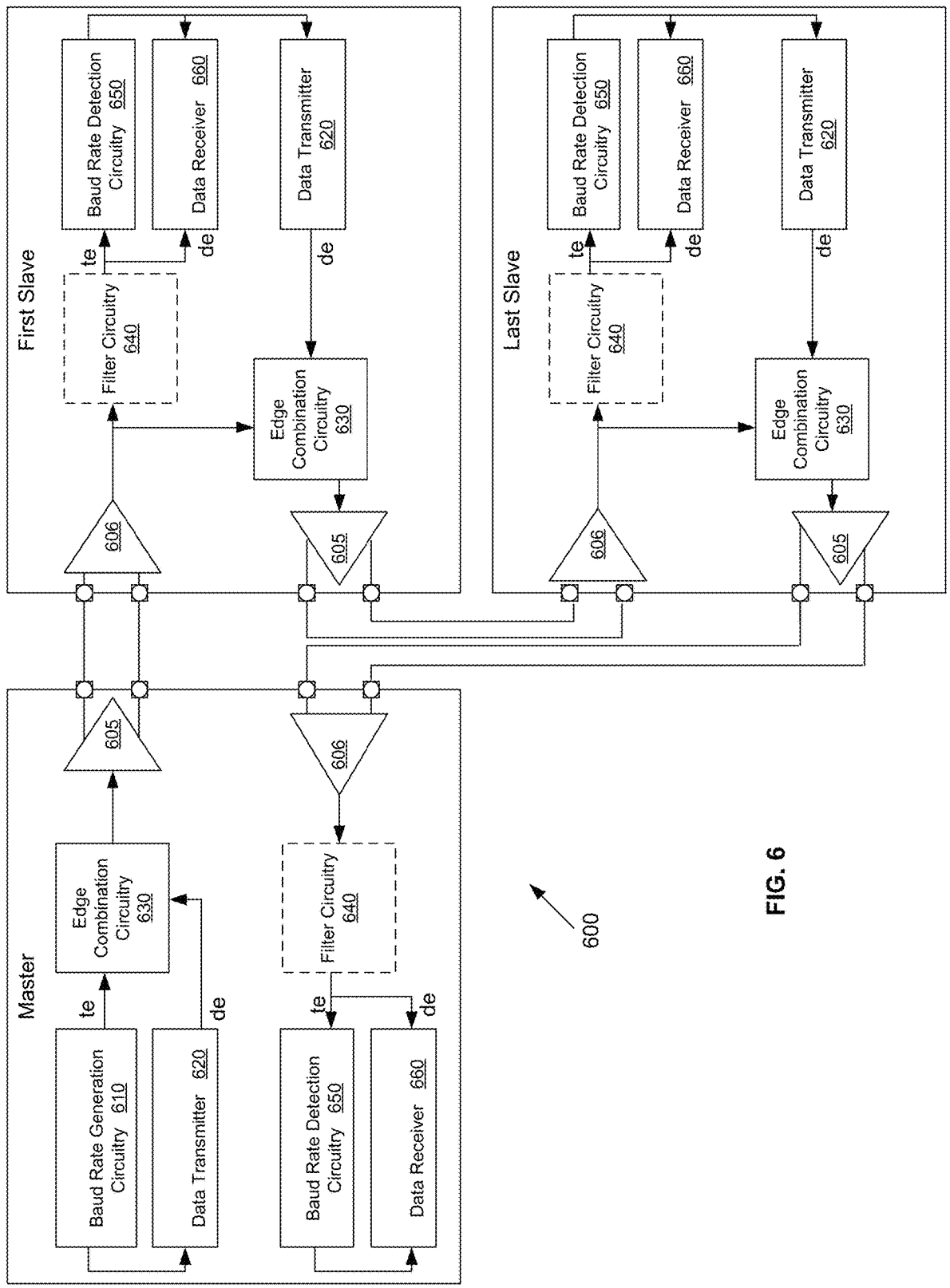
FIG. 6 illustrates one example of a communication system that includes a master device and a chain of slave devices performing communication using edge timing in a signal in accordance with various aspects described.
Figure 7:
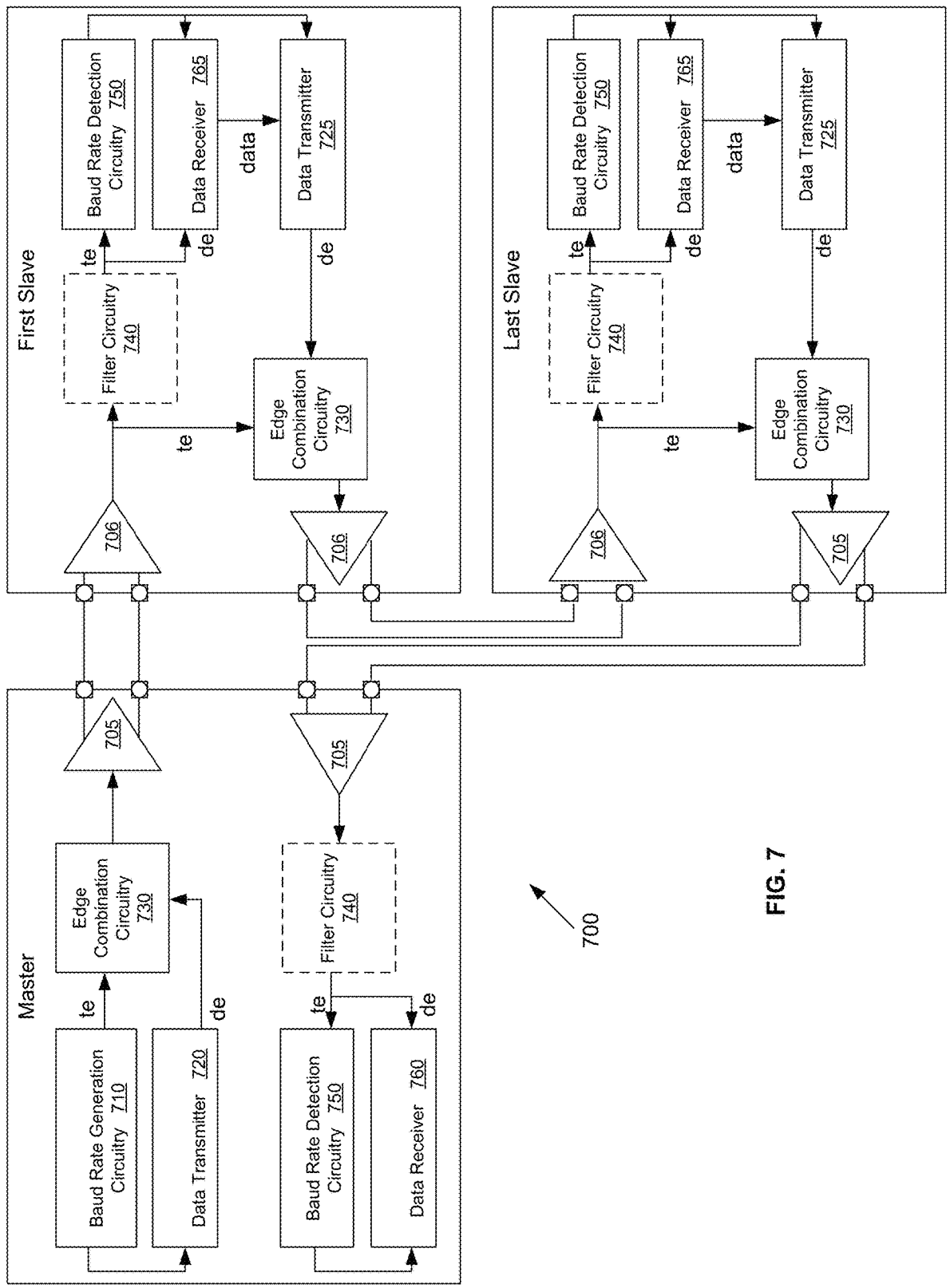
FIG. 7 illustrates one example of a communication system that includes a master device and a chain of slave devices performing communication using edge timing in a signal in accordance with various aspects described.

In some examples the master 102 is microcontroller that provides pulse-width-modulated (PWM) or other control signals to the slave 104 and possibly a chain of multiple slaves (see FIGS. 6 and 7). In some examples, the slave 104 is a gate driver for a high power device such as a fuel injector, motor, battery control or monitoring device, or solenoid. In some examples, the slave 104 is an isolated gate driver for a measurement device that measures, as controlled by the master 102, a temperature or voltage of another device and generates digital data encoding the measured temperature or voltage.

Figure 2:
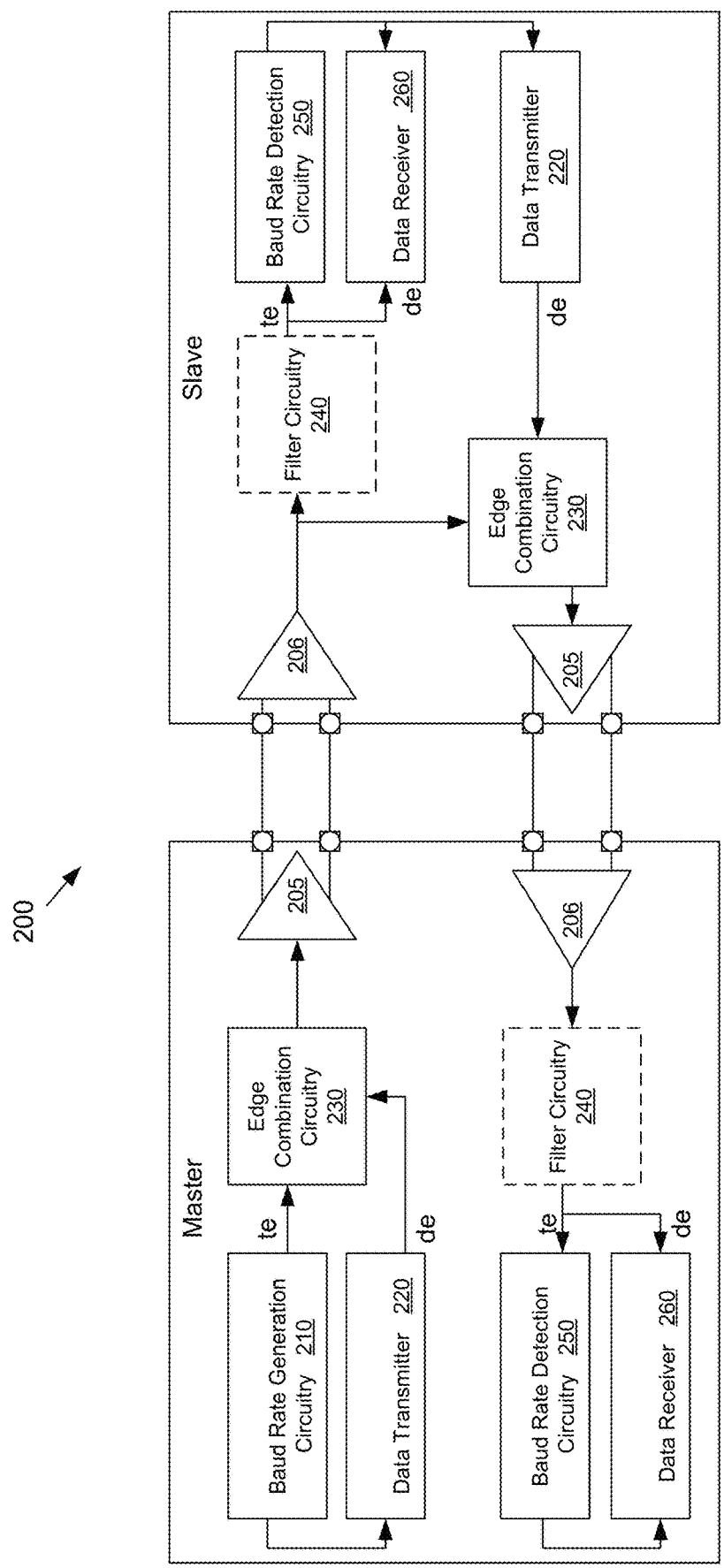
FIG. 2 illustrates one example of a communication system that includes two devices performing communication using edge timing in a signal in accordance with various aspects described.

FIG. 2 illustrates an example communication system 200 that includes a master and a slave device. Each device includes a transmit physical interface 205 and a receive physical interface 206. Two signal line pairs are coupled to each of the interfaces 205, 206 and connect the master to the slave, one for communication from the master to the slave and the other for communication from the slave to the master. In one example, the physical interfaces 205, 206 are low-voltage differential swing (LVDS) interfaces which provide relatively high resistance to EMI. LVDS interface pins and drivers are available in many different technologies, including power-oriented technologies and microprocessor technologies, making them a good fit for the described systems. It is noted that other physical interfaces and protocol may be used in other examples. In the drawings, the symbol "te" indicates a timing edge and the symbol "de" indicates a data edge, which, as illustrated in FIGS. 1A and 1B can be either rising or falling edges.

The master includes a baud rate generation circuitry 210 that generates timing edges according to a desired baud rate for a master signal that is transmitted by the master on the interface 205. The master also includes a data transmitter 220 that generates a master transmit signal that, when combined with the timing signal output by the baud rate generation circuitry 210 will result in a signal having a master data edge in a position that encodes data (or a mode selection) to be communicated to the slave. Edge combination circuitry 230 combines the timing signal with the master transmit signal to generate the master signal. In one example, depending on the type of edge used for the timing edge and the data edge, simple AND or OR combination logic can be used for the edge combination circuitry 230. When timing edges are falling edges, an AND combination can be used. When timing edges are rising edges, an OR combination can be used.

The master receives a received signal or slave signal via receiver interface 206. Optional filter circuitry 240 processes the received signal to remove noise and the received signal is provided to baud rate detection circuitry 250 coupled to a data receiver 260. The use of baud rate detection circuitry 250 provides a more robust system because, while the master sets the baud rate and thus may not need to directly recover a baud rate, the baud rate detector 250 compensates for delay in the communication path between the slave and the master and also supports communication with slaves that do not use the baud rate set by the master for communication. Depending on the baud rate, the implementation of the baud rate detection circuitry 250 may differ. When the baud rates are far below the clocking capability of the device technology (e.g., a max clock rate of 200 MHz, baud rate of 20 MBits/s), a clocked implementation may be chosen. In the case where the ratio is not so high, a synchronous implementation (e.g., a DLL based on delay elements) may be chosen, similar to implementations for high-speed memory interfaces (e.g., DDR, DDR2, and so on). The data receiver 260 detects data in the slave signal based on the timing of data edges in the slave signal with respect to the timing edges/baud rate detected by baud rate detection circuitry 250.

The slave device includes analogous filter circuitry 240, baud rate detection circuitry 250, data receiver 260, data transmitter, and edge combination circuitry 230 as just described with reference to the master device. The function of these blocks will not be repeated for the sake of brevity. The slave includes a path for the received or master signal to travel to the edge combination circuitry 230. This path allows the slave to operate in a "transparent" mode in which the slave transmit signal (output by data transmitter 220) is a constant transparency value that when combined with the received signal simply passes the received signal through the slave without any processing or modification by the slave. This transparent mode of operation is beneficial when multiple slaves are included in a chain as will be discussed with reference to FIGS. 6 and 7. In the system 200, the slave does not include baud rate generation circuitry because the master defines the baud rate for both the upstream channel and downstream channel and the slave recovers this timing using the timing edges in the received signal.

Figure 3:
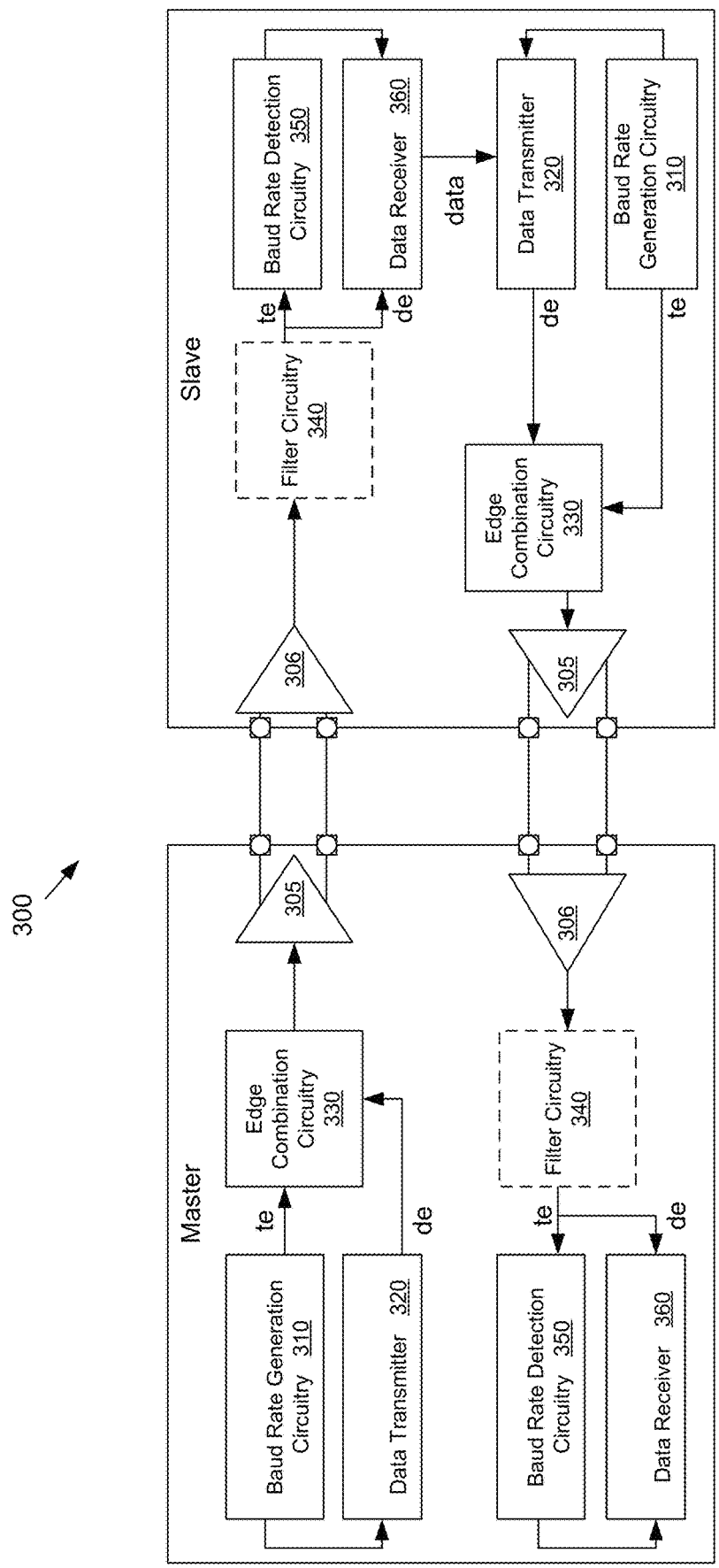
FIG. 3 illustrates one example of a communication system that includes two devices performing communication using edge timing in a signal in accordance with various aspects described.

FIG. 3 illustrates a communication system 300 in which the slave includes baud rate generation circuitry 310 that functions analogously to baud rate generation circuitry 210 of FIG. 2. The baud rate may be determined based on the baud rate used by the master (e.g., via PLL). The slave does not include the path for the received signal to travel to edge combination circuitry 330. Thus, the slave generates both the timing edge (according to an independent slave baud rate) and the data edge in the slave signal transmitted by the slave.

Figure 4:
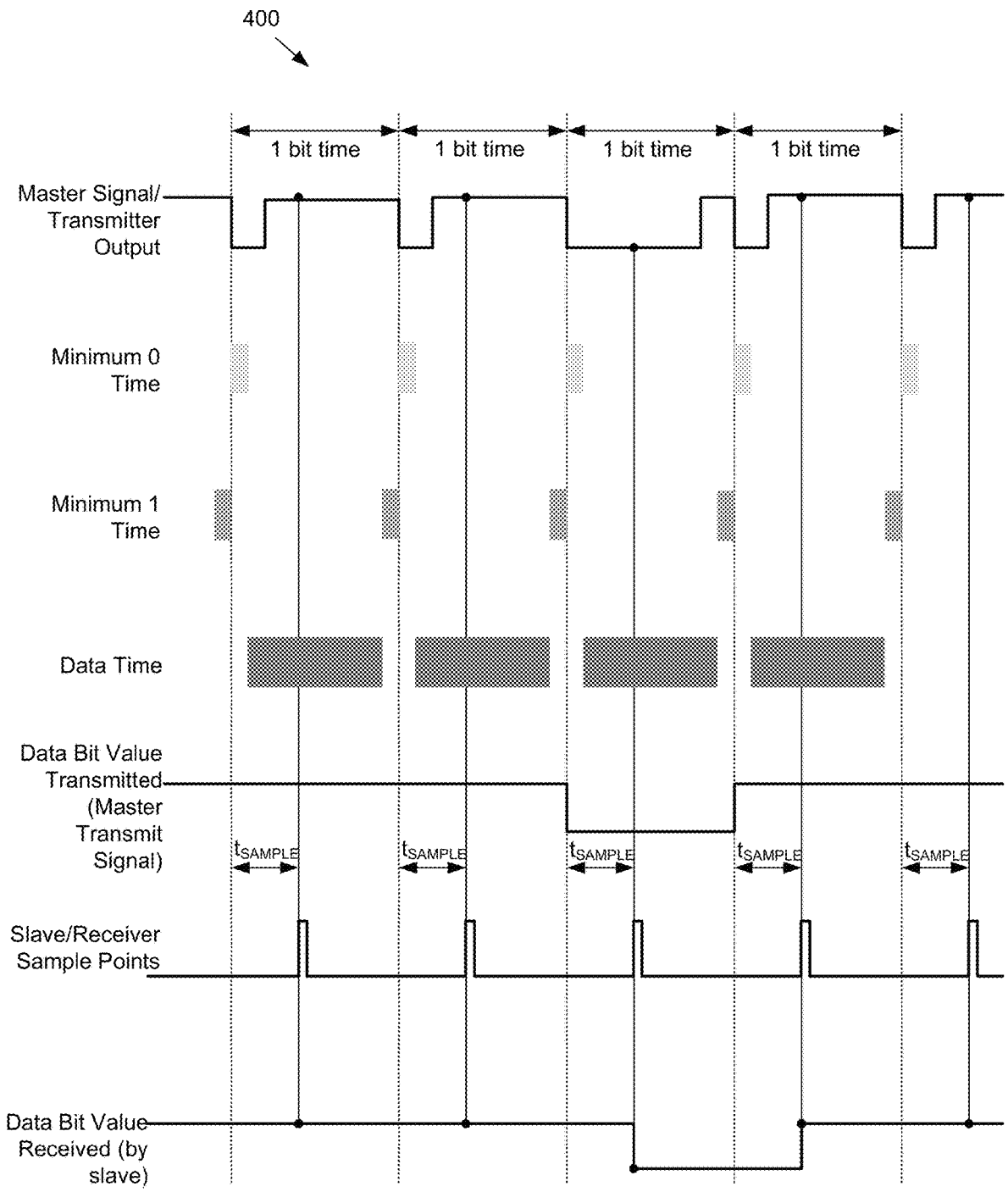
FIG. 4 illustrates a timing diagram of one example write communication protocol for communication using edge timing in a signal in accordance with various aspects described.

FIG. 4 illustrates an example timing diagram 400 for master device write mode operation when timing edges are falling edges and data edges are rising edges. The master signal transmitted by the master device (transmitter output) delivers the timing edges with an equidistant timing (here: 1 bit time) and the data edges have timing according to the data value to be transferred. A minimum 0 time should be respected to ensure that the receiver can correctly detect the intended timing edge. A minimum 1 time should also be respected to ensure a correct detection of the data edge. The lengths of the minimum 0 time and the minimum 1 time depend on the technology and the signal driver and receiver implementation. The remaining bit time may be used to set the level for the output according to the desired data value or level.

The slave/receiver defines its sampling points for the data at a defined time after the received timing edges. Delays due to signal propagation and the intrinsic speed of the components should be respected. In this example, the sampling point is set to about half of the bit time, but the sampling time may be located at different positions in the bit time. If the transmitter/master baud rate changes (e.g., due to drift or aging or temperature) the slave/receiver may automatically adapt is sampling point accordingly to keep the sampling at the same relative position with respect to the timing edge. Or, if the slave/receiver has a (quite precise) clock source, the delay time may stay similar, even if the master/transmitter baud rate changes.

Figure 5:
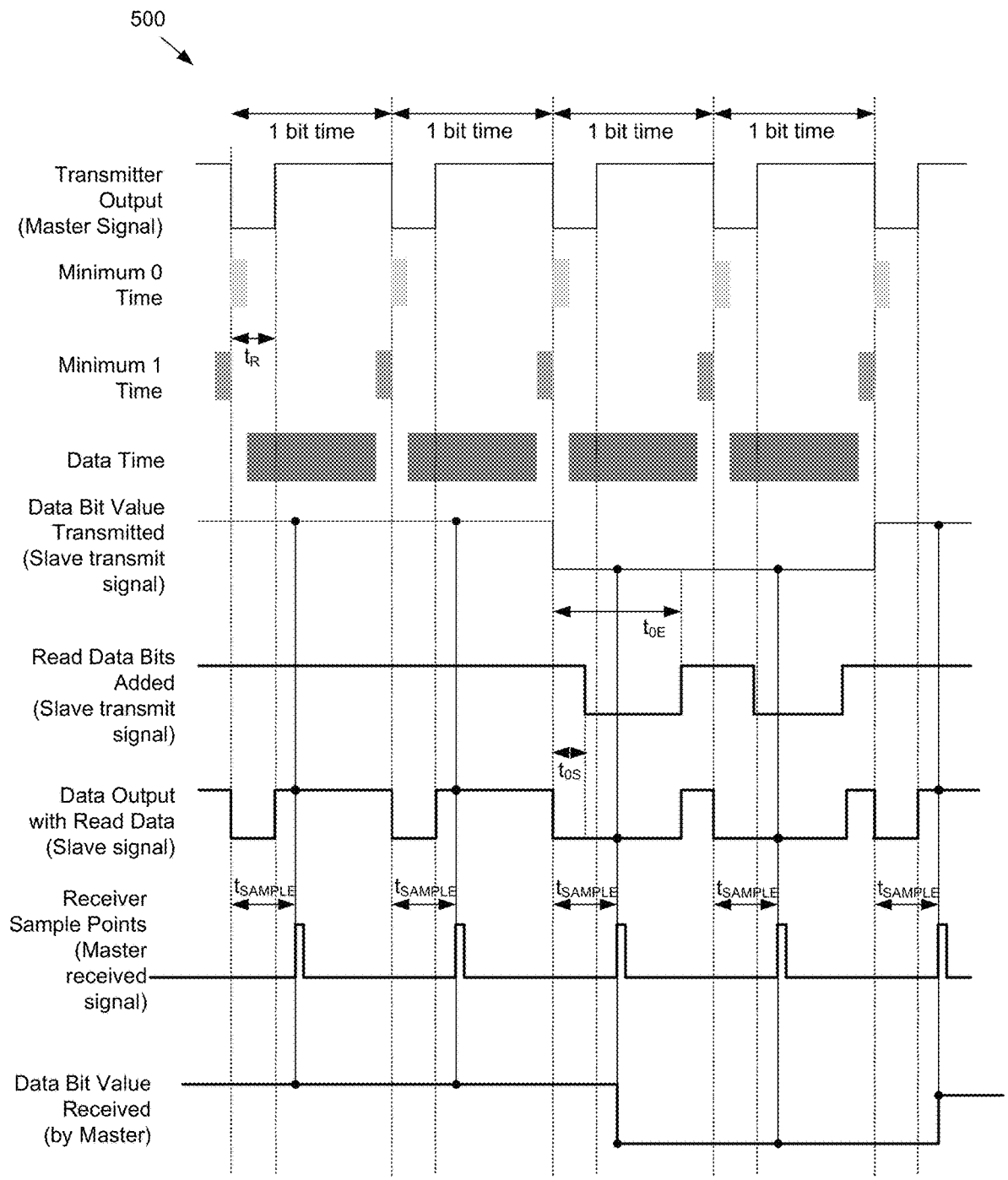
FIG. 5 illustrates a timing diagram of one example read communication protocol for communication using edge timing in a signal in accordance with various aspects described.

FIG. 5 illustrates an example timing diagram 500 for master device read mode operation when timing edges are falling edges and data edges are rising edges. It is assumed that the master has issued a request for read data to the slave and that the slave will deliver read data to the master. The master continues providing the timing edges in the master signal to allow synchronous operation. The read data (i.e., slave transmit signal) that is provided by the slave is used to modify the timing of the data edge in the master signal according to the bit value to be transferred while maintaining the timing edges in the signal coincident with the timing edges in the master signal. To avoid interference of data edges sent by the master (in order to send timing edges, the master must also send data edges) and data edges sent by the slave, the timing of the data edges changes to read mode timing ($t_R$). The read mode timing of the master may be similar to (or close to) the timing for transmitting a 1 bit level (looking like an idle bus, assuming that a 1 level is the idle level).

As long as the slave device does not send its own data, the slave may remain in transparent mode where the slave signal is equal to the received master signal. Assuming a logical AND combination between the master signal and the slave transmit signal by edge combination circuitry (see FIGS. 2-3), the idle data level (no modification of bits between the slave input and output) is a 1 level. As a consequence, the master's data transmitter 220 in FIG. 2 outputs a 1 when it is not outputting its own data. This occurs, for example, when master has requested data from the slave.

FIG. 6 illustrates a communication system 600 in which multiple (e.g., two are shown, but more are possible) slaves are connected in a daisy chain arrangement with a single master. In this system, the slave devices may operate in transparent mode to output directly the signal received from the previous device. When the master device sends a write data frame, all the slave devices receive it nearly at the same time because only the propagation delay through the slaves adds to the timing. The propagation delay may change slowly with temperature or supply voltage, but does not jitter from frame to frame.

If the master has issued a command to write a frame to request data from one of the slaves, the master may output a bit stream with read mode timing and the selected slave may modify the data stream according to the data to be transferred. Any slave that has not received a request for data stays in transparent mode, and does not modifying the data stream. Even if the selected slave requires some time to react and deliver the data on the bus, the master may continue outputting a read mode signal while it is waiting for an answer.

An advantageous way to indicate the start of a new data frame (for both write data and read data) is to use a UART-protocol-like signaling. If no data is transferred, the bit timing looks like sending a permanent 1 data bit level on the bus (idle bit level). The first 0 data level indicates that a new data frame has started (SOF=start of frame indication), followed by a defined umber of data bits. After the last bit, a STOP bit may be introduced that is represented by a 1 data bit level (similar to normal UART protocol). Another coding scheme (e.g., with opposite data levels) may be chosen in other examples. Also other coding schemes may be chosen. UART requires low implementation effort and has a good ratio between data payload and control overhead. The fact that the edge timing based communication is self-synchronizing allows the use of relatively long UART-like data frames (e.g., with a data payload of 32 bits or more).

In many automotive applications, 32 bit wide SPI frames are used to communicate between two devices (e.g., a microcontroller and a power control device). The proposed interface may replace the SPI interface in these applications, especially when the SPI baud rate is at its limits (normally not above 10 MHz shift clock rate with normal pins, higher baud rates are possible but require more dedicated pins).

An enumeration procedure may be used after power up (e.g., if slave devices forget their name and position in the chain when not powered). The process may happen as follows. A signal including data corresponding to a "first contact" message is sent by the master and the slaves are all in transparent mode. The data sent by the master is eventually received back by the master, indicating that the chain is intact and the slaves are powered and operable. The master then sends out data corresponding to a request for enumeration. When a slave receives this request it deactivates its data transmitter.

Then, the master sends a naming message which may include a name or identification encoded in the message. The message is received by the first slave in the chain but not passed on. In the case that the naming message includes a name or identification, the first slave in the chain then adopts the name or identification. The first slave in the chain enables its transmitter to acknowledge the naming or identification by adjusting the data edges in the signal. Alternatively, the name or identification may be encoded in the first slave in the chain, and in this case the first slave in the chain transmits the name or identification back to the master by adjusting the data edges in the signal. Either way, the newly named slave then enters transparent mode so that the next slave in the chain can be named. Once the master receives back an unacknowledged naming message, the enumeration is complete. If a timeout criteria (in the slave or master) is met, the enumeration process may be terminated as being corrupted. In the enumeration process just described, when in transparent mode, the slaves directly forward the signal they receive as described above. Only one slave is intended to send its data after the master requests read data. As a consequence, only one data word at a time circulates in the chain of slave devices.

FIG. 7 illustrates an example communication system 700 that provides some advantages over the system 600 in that multiple data words may circulate in the chain at the same time. The slaves "directly" forward the timing edges of the received signal to ensure synchronous operation without jitter due to the synchronization effects from one device to another. In the system 700 the slave devices include a path or mechanism for received data detected by a data receiver 765 to be provided directly to a data transmitter 725. Thus the slave data transmitter 725 receives data from either the data receiver 765 or internal processing components (not shown) of the slave. In this manner the slave may receive data from its input in the data receiver and may send out other data in parallel via its data transmitter 725.

If the data receiver 765 has received a complete data word, the receiver may either directly hand over the received data word to the data transmitter 725 in order to send it to the next device (e.g., if the data word does not target the slave). Alternatively, the data receiver 765 may store the data word and the slave may process the word internally (e.g., when the data word targets the slave). Depending on the content of the received data word, the slave may modify the received data before sending the data out again (e.g., to indicate that the slave correctly received the data), or the slave may send other data (e.g., after a read request by the master). As a consequence, more than one data word may circulate at a time in the chain of slaves. This approach involves a more elaborate bit timing and possibility to modify the contents of the data bits.

Figures 8, 9, 10:
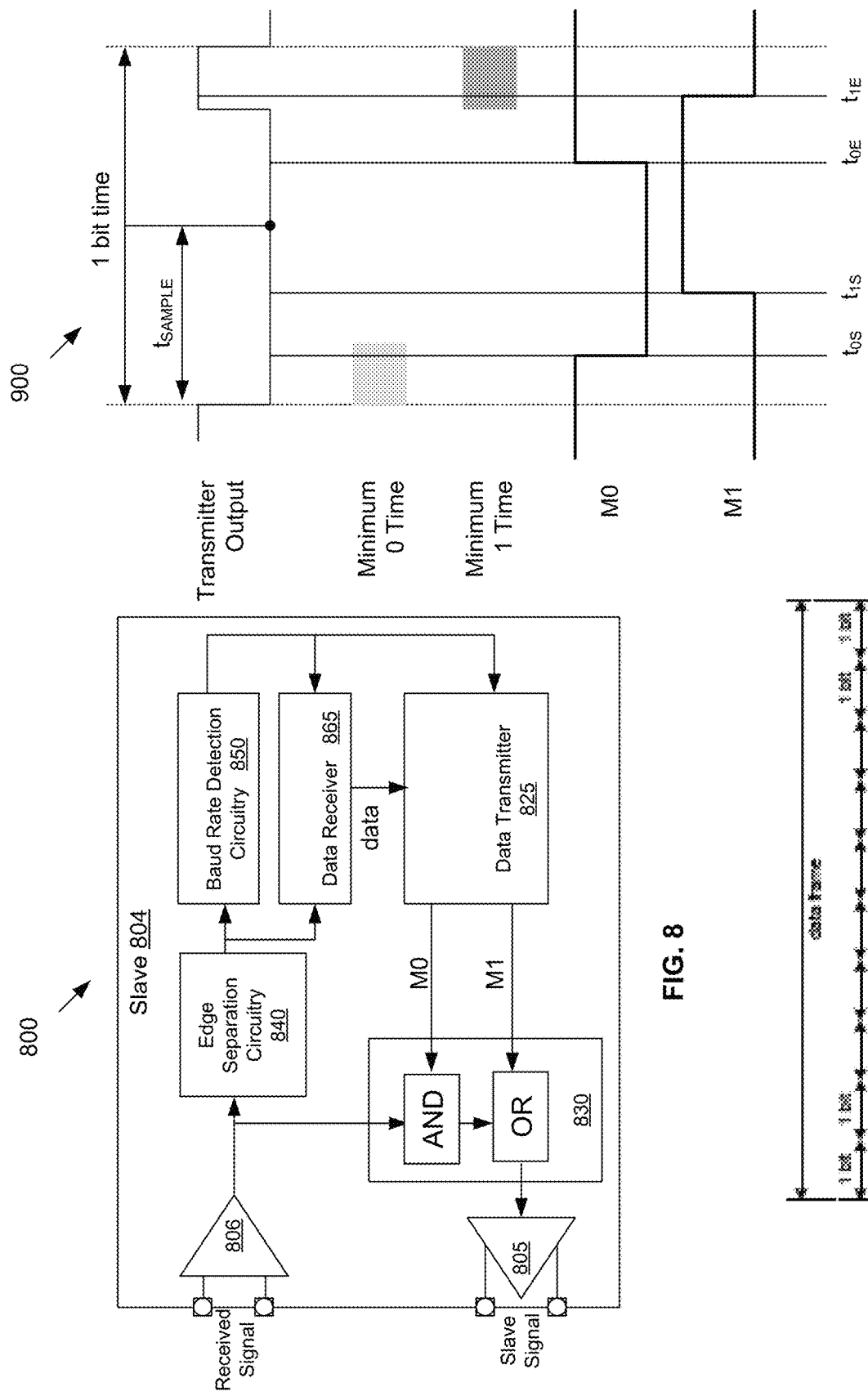
FIG. 8 illustrates one example of a communication device configured to perform communication using edge timing in a signal in accordance with various aspects described.
FIG. 9 illustrates a timing diagram illustrating minimum 0 time and minimum 1 time for a communication protocol for communication using edge timing in a signal in accordance with various aspects described.
FIG. 10 illustrates an example UART-like data frame in accordance with various aspects described.

FIG. 8 illustrates an example slave 804 that is capable of the functions described in FIG. 7. The slave 804 includes edge combination circuitry 830 that functions to "remove" the data edge from the received signal and add a data edge from a data transmitter 825, while preserving the timing edge from the received signal. FIG. 9 illustrates a timing diagram 900 that is helpful in describing the functioning of the slave 804. The minimum 0 time and minimum 1 time should be respected to ensure that the self-synchronization mechanism with the timing edge works without jitter due to interference with device-internal clocks or settings.

In order to modify the received data bit to a data bit with a 0 value, a logic AND function with a mask M0 (a mask that forces a 0 bit value) may be used to generate an intermediate result. Mask M0 may include a 0 level between the timing points $t_{0S}$ (time to start a 0) and $t_{0E}$ (time to end a 0), otherwise the idle level of M0 is 1. In order to modify the received data bit to data bit with a 1 value, a logic OR function with a mask M1 (mask to force a 1 data value) and the intermediate result may be used. Mask M1 may include a 1 level between the timing points tis (time to start a 1) and $t_{1E}$ (time to end a 1), otherwise the idle level of M1 is 0.

For setting the timing it is important that also the timing for the sampling is respected. The sampling time should take into account propagation delay, settling time, and so on. To ensure that only one timing edge and one data edge occur during one bit time, the timing points to activate and deactivate a mask should be chosen carefully. The starting point $t_{0S}$ of M0 should take place before the minimum 0 time ends, because some other device may have issued a 1 level just after the end of the minimum 0 time. If $t_{0S}$ would be located after the minimum 0 time, there would be a risk that a short 1 level occurs. If mask M1 would start at point tis too early, there would be the risk that the minimum 0 time becomes too short. A similar effect defines the location of the end point $t_{1E}$ of the mask M1. Here it should be ensured that the mask M1 is active until the minimum 1 time is reached and mask M0 is deactivated before the minimum 1 time starts (to avoid a 0 level spike or a too short minimum 1 time). Generally, the timing of mask M0 is earlier (with respect to the first timing edge) than the timing of mask M1. If this is the case and the minimum 0 time and the minimum 1 time are respected, each slave in the chain may modify its output data independently from the other slaves.

If UART-like communication protocol (as shown in FIG. 10) is used (e.g., using a start-of-frame bit SOF for the start and a STOP bit for the end of a data frame), an inter-frame idle timing may be defined to allow a smooth handling (e.g., decoding of the received data before outputting the requested read data with the next output data frame). This inter-frame idle time may comprise several bit times to allow a certain reaction time of the devices. Even if the transfers of several data frames between several communication devices do not start and end at the same time (e.g., the SOF bits of the frames are not happening within the same bit time), the bit times themselves are synchronous to each other due to the timing edges.

Figure 11:
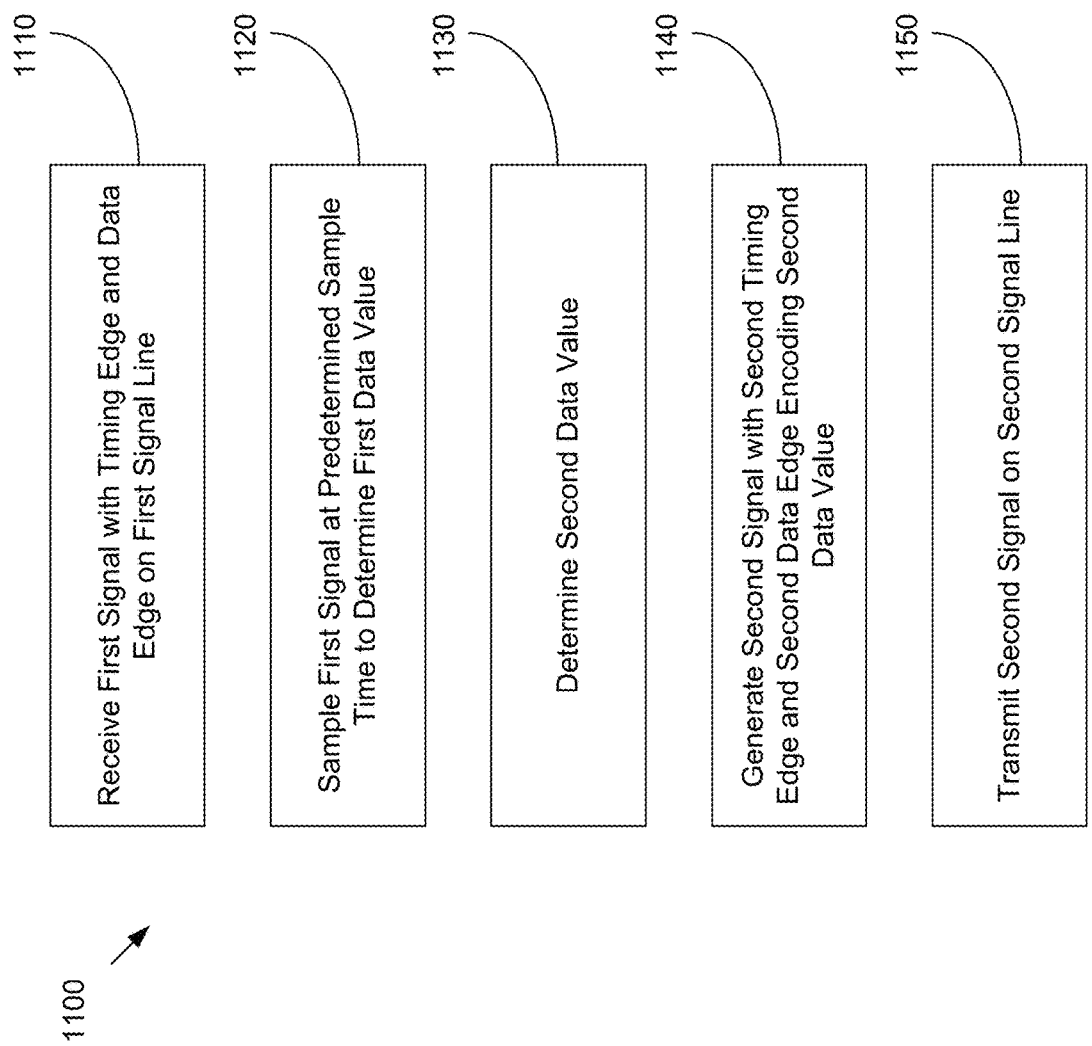
FIG. 11 is a flow diagram outlining an example method for performing communication using edge timing in a signal in accordance with various aspects described.

FIG. 11 illustrates a flow diagram depicting an example method 1100 for performing communication using edge timing, also supporting slave devices in a daisy chain topology. The method includes, at 1110, receiving, on a first signal line, a first signal having a first timing edge and a first data edge. The first timing edge is of a different type than the first data edge. The first data edge is an edge immediately adjacent to the first timing edge and occurs at a first elapsed time after the first timing edge. The method includes, at 1120, sampling the first signal at a predetermined sample time after the first timing edge to determine a first data value. At 1130, a second data value is determined and a second signal is generated having a second timing edge and a second data edge. A second elapsed time between the second timing edge and the second data edge encodes a second data value. At 1150, the second signal is transmitted on a second signal line.

It can be seen from the foregoing description that the described systems, circuitries, and methods allow for the communication of data between two or more devices by using the timing of one type of edge with respect to the other type of edge in the signal to convey data.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, circuitries, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to perform acts of the method or of an apparatus or system for communication using edge timing according to embodiments and examples described herein.

Example 1 is a method, including receiving, on a first signal line, a first signal having a first timing edge and a first data edge. The first timing edge is of a different type than the first data edge and the first data edge is an edge immediately adjacent to the first timing edge and occurs at a first elapsed time after the first timing edge. The method includes sampling the first signal at a predetermined sample time after the first timing edge to determine a first data value. The method includes determining a second data value and generating a second signal having a second timing edge and a second data edge. A second elapsed time between the second timing edge and the second data edge encodes the second data value. The second signal is transmitted on a second signal line.

Example 2 is a communication device configured to receive a first signal having a first timing edge followed after a first elapsed time by an immediately adjacent first data edge and to transmit a second signal having a second timing edge followed after a second elapsed time by an immediately adjacent second data edge. The communication device includes baud rate detection circuitry, a data receiver, a data transmitter, and edge combination circuitry. The baud rate detection circuitry is coupled to a receiver interface and is configured to detect the first timing edges in a received first signal. The data receiver is configured to sample the first signal at a predetermined sample time after each detected first timing edge to determine an encoded first data value. The data transmitter is configured to determine a second data value for transmitting and generating a transmit signal including a second data edge at an elapsed time after a corresponding second timing edge such that the elapsed time encodes the second data value. The edge combination circuitry is configured to combine the transmit signal with a timing signal that includes a second timing edge.

Example 3 is a communication system including a chain of slave devices and a master device. Each slave device is configured to: receive a signal having a timing edge and a data edge; determine data based on an elapsed time between the timing edge and the data edge; generate a slave signal by combining the received signal with a slave transmit signal, wherein the slave signal includes the timing edge and a slave data edge, wherein an elapsed time between the timing edge and the slave data edge encodes slave data; and transmit the slave signal to a next device. The master device is configured to generate a master transmit signal having the timing edge and a master data edge, wherein a first elapsed time between the timing edge and the master data edge encodes master data; transmit the master transmit signal to a first slave device in the chain of slave devices; receive a slave signal from a last slave device in the chain of slave devices, wherein the slave signal has the timing edge and the slave data edge; and determine slave data based on an elapsed time between the timing edge and the slave data edge.

The foregoing description of one or more implementations provides illustration and description, but is not intended to be exhaustive or to limit the scope of the example embodiments to the precise form disclosed. Modifications and variations are possible in light of the above teachings or may be acquired from practice of various implementations of the example embodiments.

Various illustrative logics, logical blocks, modules, circuitries, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In the present disclosure like reference numerals are used to refer to like elements throughout, and wherein the illustrated structures and devices are not necessarily drawn to scale. As utilized herein, terms "module", "component," "system," "circuit," "circuitry," "element," "slice," and the like are intended to refer to a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuitries can reside within a process, and circuitry can be localized on one computer and/or distributed between two or more computers. A set of elements or a set of other circuitry can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include field gates, logical components, hardware encoded logic, register transfer logic, one or more processors therein to execute software and/or firmware that confer(s), at least in part, the functionality of the electronic components.

It will be understood that when an element is referred to as being "electrically connected" or "electrically coupled" to another element, it can be physically connected or coupled to the other element such that current and/or electromagnetic radiation can flow along a conductive path formed by the elements. Intervening conductive, inductive, or capacitive elements may be present between the element and the other element when the elements are described as being electrically coupled or connected to one another. Further, when electrically coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

What is claimed is:

1. A method, comprising, with a second device:
   receiving, on a first signal line, a first signal from a first device, wherein the first signal has a first timing edge and a first data edge, wherein the first timing edge is of a different type than the first data edge, further wherein the first data edge is an edge immediately adjacent to the first timing edge and occurs at a first elapsed time after the first timing edge;

sampling the first signal at a predetermined sample time after the first timing edge to determine a first data value;

identifying a second data value to be transmitted to a third device;

generating a second signal having a second timing edge and a second data edge, wherein a second elapsed time between the second timing edge and the second data edge encodes the second data value; and transmitting the second signal to the third device on a second signal line.

2. The method of claim 1, further comprising generating the second signal by:

generating a transmit signal; and combining the first signal with the transmit signal, wherein the transmit signal includes a second data edge at the second elapsed time after the first timing edge such that when the transmit signal is combined with the first signal, the second signal includes i) the second timing edge coincident with the first timing edge and ii) the second data edge.

3. The method of claim 1, further comprising generating the second signal by:

generating a transmit signal; and combining the first signal with the transmit signal, wherein the transmit signal includes a transparency value that, when combined with the first signal, generates the second signal equivalent to the first signal, such that the second timing edge and the second data edge are coincident with the first timing edge and the first data edge, respectively.

4. The method of claim 1, further comprising generating the second signal by:

generating a transmit signal;

generating a timing signal having the second timing edge; and combining the timing signal with the transmit signal, wherein the transmit signal includes either:

the second data edge at the second elapsed time after the second timing edge, or the second data edge at a third elapsed time after the second timing edge, wherein the third elapsed time encodes the first data value, such that when the transmit signal is combined with the timing signal the second signal includes the second timing edge and the second data edge.

5. The method of claim 4, comprising generating the timing signal based on the first signal.

6. The method of claim 1, further comprising generating the second signal by:

generating a transmit signal; and combining the first signal with the transmit signal, wherein the transmit signal includes either:

the second data edge at the second elapsed time after the first timing edge, or the second data edge at the first elapsed time after the first timing edge, such that when the transmit signal is combined with the first signal the second signal includes i) the second timing edge coincident with the first timing edge and (ii) the second data edge.

7. The method of claim 6, wherein:

the transmit signal comprises:

a 0 bit value transmit signal, wherein the 0 bit value transmit signal comprises:

a constant signal of level 1 when the second data value is 1, or a 0 mask signal when the second data value is 0; and a 1 bit value transmit signal, wherein the 1 bit value transmit signal comprises:

a constant signal of level 0 when the second data value is 0, or a 1 mask signal when the second data value is 1; and generating the second signal comprises:

performing an AND combination of the first signal and the 0 bit value transmit signal to generate an intermediate result signal; and performing an OR combination of the intermediate result signal and the 1 bit value transmit signal to generate the second signal.

8. The method of claim 1, wherein:

the first signal comprises a read mode signal having a series of equally spaced first timing edges and first data edges;

generating the second signal comprises:

generating a transmit signal having the second data edge at the second elapsed time after the first timing edge; and combining the first signal with the transmit signal, such that when the transmit signal is combined with the first signal the second signal includes i) the second timing edge coincident with the first timing edge and (ii) the second data edge.

9. The method of claim 1, wherein the predetermined sampling time is selected to fall within a sampling interval of a signal period of the first signal, wherein the sampling interval begins at a first predetermined time after the timing edge and ends at a second predetermined time before a subsequent timing edge.

10. The method of claim 1, comprising:

with the third device:

identifying a third data value to be transmitted to a fourth device;

generating a third signal having a third timing edge and a third data edge, wherein a third elapsed time between the third timing edge and the third data edge encodes the third data value; and transmitting the third signal to the fourth device on a third signal line.

11. The method of claim 1, further comprising:

determining whether data is requested;

when data is requested, generating the second signal having the second data edge, wherein the second elapsed time encodes a value for the requested data; and when data is not requested, generating the second signal having the second data edge coincident with the first data edge.

12. A second communication device configured to receive, from a first device, a first signal having a first timing edge followed after a first elapsed time by an immediately adjacent first data edge and to transmit a second signal having a second timing edge followed after a second elapsed time by an immediately adjacent second data edge, the second communication device comprising:

baud rate detection circuitry coupled to a receiver interface, wherein the baud rate detection circuitry is configured to detect the first timing edges in a received first signal;

a data receiver configured to sample the first signal at a predetermined sample time after each detected first timing edge to determine an encoded first data value; and data transmitter configured to:

identify a second data value for transmitting to a third device; and generate a transmit signal including a second data edge at an elapsed time after a corresponding second timing edge, wherein the elapsed time encodes the second data value; and edge combination circuitry configured to combine the transmit signal with a timing signal that includes a second timing edge.

13. The second communication device of claim 12, wherein the timing signal comprises the first signal such that the second timing edge coincides with a corresponding first timing edge.

14. The second communication device of claim 12, further comprising baud rate generation circuitry configured to generate the timing signal, wherein the timing signal includes the second timing edge.

15. The second communication device of claim 14, wherein baud rate generation circuitry is configured to generate the timing signal based on the first signal.

16. The second communication device of claim 14, wherein the edge combination circuitry is configured to perform a logical AND operation on the transmit signal and the timing signal.

17. The second communication device of claim 14, wherein the edge combination circuitry is configured to perform a logical OR operation on the transmit signal and the timing signal.

18. The second communication device of claim 12, wherein the data transmitter circuitry is configured to operate in a write mode or a transparent mode, further wherein the data transmitter circuitry is configured to:

when in write mode, generate the second data edge in the transmit signal at the second elapsed time after the first timing edge such that when the transmit signal is combined with the first signal, the second signal includes i) the second timing edge coincident with the first timing edge and ii) the second data edge, and when in transparent mode, generate the transmit signal to have a constant transparency value that, when combined with the first signal, generates the second signal equivalent to the first signal, such that the second timing edge and the second data edge are coincident with the first timing edge and the first data edge, respectively.

19. The second communication device of claim 12, wherein the data transmitter is configured to operate in a write mode or a transparent mode, further wherein the data transmitter is configured to:

when in the write mode, generate the second data edge in the transmit signal at the second elapsed time after the second timing edge, and when in the transparent mode, generate the second data edge in the transmit signal at a third elapsed time after the second timing edge, wherein the third elapsed time encodes the first data value, such that when the transmit signal is combined with the timing signal the second signal includes the second timing edge and the second data edge.

20. A communication system, comprising:

a chain of slave devices, wherein each slave device is configured to:

receive a signal having a timing edge and a data edge;

determine data based on an elapsed time between the timing edge and the data edge;

generate a slave signal by combining the received signal with a slave transmit signal, wherein the slave signal includes the timing edge and a slave data edge, wherein an elapsed time between the timing edge and the slave data edge encodes slave data; and transmit the slave signal to a next device; and a master device configured to:

generate a master transmit signal having the timing edge and a master data edge, wherein a first elapsed time between the timing edge and the master data edge encodes master data;

transmit the master transmit signal to a first slave device in the chain of slave devices;

receive a slave signal from a last slave device in the chain of slave devices, wherein the slave signal has the timing edge and the slave data edge; and determine slave data based on an elapsed time between the timing edge and the slave data edge.

21. The communication system of claim 20, wherein each slave device is configured to operate in a write mode or a transparent mode, such that:

when in the write mode, the slave device generates the slave data edge in the slave signal at a first elapsed time after the timing edge that encodes the slave data; and when in the transparent mode, the slave device generates the slave data edge in the slave signal at a second elapsed time after the timing edge that encodes the data determined from the received signal.

\* \* \* \* \*